(12) United States Patent
Kim et al.

(10) Patent No.: US 8,194,621 B2
(45) Date of Patent: Jun. 5, 2012

(54) METHOD OF ALLOCATING UPLINK TRANSMISSION CHANNELS IN A COMMUNICATION SYSTEM

(75) Inventors: Bong Hoe Kim, Ansan-si (KR); Joon Kui Ahn, Seoul (KR); Hak Seong Kim, Seoul (KR); Dong Wook Roh, Seoul (KR); Dong Youn Seo, Seoul (KR); Seung Hwan Won, Gwancheon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/162,340

(22) Filed: Jun. 16, 2011

(65) Prior Publication Data

US 2011/0243101 A1 Oct. 6, 2011

Related U.S. Application Data

(63) Continuation of application No. 12/855,643, filed on Aug. 12, 2010, now Pat. No. 7,986,675, which is a continuation of application No. 11/121,549, filed on May 4, 2005, now Pat. No. 7,801,086.

(60) Provisional application No. 60/567,430, filed on May 4, 2004.

(30) Foreign Application Priority Data

| May 4, 2004 | (KR) | ........................ 10-2004-0031379 |
| Jun. 17, 2004 | (KR) | ........................ 10-2004-0045067 |
| Jun. 18, 2004 | (KR) | ........................ 10-2004-0045578 |

(51) Int. Cl.
*H04B 7/216* (2006.01)

(52) U.S. Cl. ........................ 370/335; 370/328; 375/145

(58) Field of Classification Search .................. 370/328, 370/335; 375/145
See application file for complete search history.

(56) References Cited

U.S. PATENT DOCUMENTS

| 7,339,998 B2 | 3/2008 | Murata et al. |
| 7,428,424 B2 | 9/2008 | Hwang et al. |
| 2002/0164980 A1 | 11/2002 | Eriksson et al. |

(Continued)

FOREIGN PATENT DOCUMENTS

CN 1411185 4/2003

(Continued)

OTHER PUBLICATIONS

European Telecommunications Standards Institute (ETSI), "Universal Mobile Telecommunications System (UMTS); Spreading and Modulation (FDD) (3GPP TS 25.213 version 6.0.0 Release 6);" ETSI TS 125 213; v6.0.0; Dec. 2003.

(Continued)

*Primary Examiner* — Steven Lim
(74) *Attorney, Agent, or Firm* — Lee, Hong, Degerman, Kang & Waimey

(57) ABSTRACT

A method of allocating channels in a user equipment is disclosed. In particular, a method of allocating a plurality of Dedicated Physical Channels (DPCHs) and Enhanced Dedicated Channels (E-DCHs) in a user equipment of a multicode transmission system. The method includes determining whether a High Speed Downlink Shared Channel (HS-DSCH) is configured for the user equipment (UE) and determining a number of codes used by the DPCH and the E-DCH. The method further includes allocating the DPCH and the E-DCH channels to an I branch or a Q branch based on the number of codes used by the DPCH and the E-DCH and the HS-DSCH configuration.

4 Claims, 2 Drawing Sheets

U.S. PATENT DOCUMENTS

| | | | |
|---|---|---|---|
| 2003/0133429 A1 | 7/2003 | Choi | |
| 2003/0193913 A1 | 10/2003 | Murata et al. | |
| 2004/0174850 A1 | 9/2004 | Vimpari et al. | |
| 2004/0219919 A1 | 11/2004 | Whinnett et al. | |
| 2005/0068921 A1* | 3/2005 | Liu | 370/335 |
| 2005/0141560 A1 | 6/2005 | Muthiah et al. | |
| 2005/0141580 A1 | 6/2005 | Partlo et al. | |
| 2006/0234741 A1 | 10/2006 | Provvedi | |
| 2007/0127369 A1 | 6/2007 | Sebire | |
| 2010/0322200 A1 | 12/2010 | Kim et al. | |

FOREIGN PATENT DOCUMENTS

| | | |
|---|---|---|
| CN | 1426172 | 6/2003 |
| EP | 0977393 | 2/2000 |
| EP | 1248485 | 10/2002 |
| JP | 2003-304195 | 10/2003 |
| KR | 10-2000-0056186 | 9/2000 |
| KR | 100362574 | 11/2002 |
| KR | 1020030096406 | 12/2003 |
| KR | 10-0439089 | 7/2004 |
| KR | 1020050073497 | 7/2005 |
| RU | 2173504 | 6/2000 |
| RU | 2197786 | 1/2003 |
| WO | 9900911 | 1/1999 |
| WO | 9963692 | 12/1999 |
| WO | 0048328 | 8/2000 |
| WO | 01/45299 | 6/2001 |
| WO | 03/041317 | 5/2003 |
| WO | 03/071707 | 8/2003 |
| WO | 03/107694 | 12/2003 |
| WO | 2005/078964 | 8/2005 |

OTHER PUBLICATIONS

A. Springer et al., "Impact of Nonlinear Amplifiers on the UMTS System," IEEE Sixth International Symposium on Spread Spectrum Techniques and Applications, vol. 2, pp. 465-469, Sep. 2000.

Samsung Electronics; "Uplink Channel Structure for HSDPA"; 3GPP TSG-RAN WG1/WG2 Joint meeting on HSDPA; Doc. 12A010009; Apr. 5, 2001; XP-002206397.

Panasonic, "Alternative Signalling Method to Control Node B Controlled TFC," 3GPP TSG-RAN WG1 Meeting #35, R1-031333, Oct. 2003.

Siemens, "Node B Controlled Rate Scheduling by Fast UE Transmission Power Limitation," TSG-RAN Working Group 1 (Radio) Meeting #33, R1-030791, Aug. 2003.

Motorola, "PAR Results for various Multiplexing Alternatives: Text Proposal," R1-031367, 3GPPRAN1#35, Nov. 2003.

3GPP Organizational Partners; "3rd Generation Partnership Project; Technical Specification Group Radio Access Network; Physical Channels and Mapping of Transport Channels Onto Physical Channels (FDD) (Release 6);" 3GPP TS 25.211; v6.0.0; Dec. 2003.

3rd Generation Partnership Project (3GPP), "Technical Specification Group Radio Access Network; Spreading and Modulation (FDD) (Release 4)," 3G TS 25.213, V4.4.0, Dec. 2003.

* cited by examiner

METHOD OF ALLOCATING UPLINK TRANSMISSION CHANNELS IN A COMMUNICATION SYSTEM

CROSS-REFERENCE TO RELATED APPLICATIONS

This application is a continuation of U.S. application Ser. No. 12/855,643, filed on Aug. 12, 2010, now U.S. Pat. No. 7,986,675, which is a continuation of U.S. application Ser. No. 11/121,549, filed on May 4, 2005, now U.S. Pat. No. 7,801,086, which claims the benefit of earlier filing date and right to priority to Korean Application No. P2004-0031379 filed on May 4, 2004, Korean Application No. P2004-0045067 filed on Jun. 17, 2004 and Korean Application No. P2004-0045578 filed on Jun. 18, 2004 and which claims the benefit of U.S. Provisional Application No. 60/567,430 filed on May 4, 2004, which are all hereby incorporated by reference herein in their entirety.

BACKGROUND OF THE INVENTION

1. Field of the Invention

The present invention relates to a method of allocating channelization code, and more particularly, to a method of allocating channelization codes using Orthogonal Variable Spreading Factor (OVSF) in a communication system. Although the present invention is suitable for a wide scope of applications, it is particularly suitable for effectively and efficiently allocating channelization codes of OVSF.

2. Discussion of the Related Art

In 3GPP, there continues to be discussions in connection with Enhanced Dedicated Channel (E-DCH) to send high speed uplink transmissions in response to high speed downlink shared channel (HS-DSCH). More specifically, from the discussions of uplink transmission in Rel 99/Rel 4/Rel 5, a consensus was reached to allocate Dedicated Physical Control Channel (DPCCH) to the Q branch while allocating Dedicated Physical Data Channel (DPDCH) to the I branch. Both the control channel and the data channel were modulated using dual channel Quadrature Phase Shift Keying (QPSK).

FIG. 1 illustrates an Orthogonal Variable Spreading Factor code tree. Particularly, transmission of DPCCH in the uplink direction always employs a spreading factor (SF) of 256 (SF=256), and the control channel, DPCCH, is allocated to code 0 ($C_{ch,256,0}$) on the Q branch. Furthermore, in a case where HS-DSCH is used in transmission, the spreading factor of 256 is used in transmitting HS-DPCCH in the uplink direction. At the same time, the code allocated for transmission also changes based on maximum number of codes available in the uplink DPDCH. In detail, when the number of codes is one, the DPDCH is allocated to the $64^{th}$ code on the Q branch, when the numbers of codes are 2, 4, or 6, the DPDCH is allocated to the first code on the I branch, and when the numbers of codes are 3 or 5, the DPDCH is allocated to the $32^{nd}$ code on the Q branch.

The uplink DPDCH is different from the downlink DPDCH in that changes in the amount of data affects how the code is allocated. More specifically, as the amount of data increases, a lower spreading factor is used so as to avoid using multicode in transmitting DPDCH in the uplink direction. For example, with increase in data rate, a lower spreading factor is used from 256 to 4. However, when the use of lower spreading factor reaches SF=4, multicodes are used to transmit high data rate via DPDCH in the uplink direction.

The channelization code of the uplink DPDCH is determined by the spreading factor. If only one code is used, the number of the OVSF code tree relating to SF/4 is used ($C_{ch,SF,SF/4}$). In addition, if two or more codes are used, the uplink DPDCH is determined not only by OVSF code tree but also the allocation of the I/Q branches. In other words, if the number of multicodes are 1 or 2, then code index 1 of SF=4 ($C_{ch,4,1}$) is allocated, if the number of multicodes are 3 or 4, then code index 3 ($C_{ch,4,3}$) is allocated, and if the number of multicodes are 5 or 6, then code index 2 ($C_{ch,4,2}$) is allocated. FIG. 2 illustrates code allocation of uplink DPCH and HS-DPCCH.

In simultaneously using the Dedicated Physical Channel (DPCH) and E-DCH for uplink transmission, if the same rule which applies to DPCH is used, a problem can arise from simultaneously occupying the same OVSF code. Furthermore, if E-DCH and DPCH are simultaneously transmitted, the code allocation scheme of E-DCH is necessary to prevent code occupancy problem.

SUMMARY OF THE INVENTION

Accordingly, the present invention is directed to a [title] that substantially obviates one or more problems due to limitations and disadvantages of the related art.

An object of the present invention is to provide a method of allocating a plurality of Dedicated Physical Channels (DPCHs) and Enhanced Dedicated Channels (E-DCHs) using I/Q branch mapping in a user equipment.

Another object of the present invention is to provide a method of allocating a plurality of Enhanced Dedicated Physical Data Channels (E-DPDCHs) using I/Q branch mapping.

Another object of the present invention is to provide a method of allocating a plurality of Enhanced Dedicated Physical Data Channels (E-DPDCHs) using I/Q branch mapping based on a configuration of High Speed Downlink Shared Channel (HS-DSCH) using I/Q branch mapping.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of allocating a plurality of Dedicated Physical Channels (DPCHs) and Enhanced Dedicated Channels (E-DCHs) in a user equipment (UE) of a multicode transmission system includes determining whether a High Speed Downlink Shared Channel (HS-DSCH) is configured for the UE. The method further includes determining a number of codes used by the DPCH and the E-DCH and allocating the DPCH and the E-DCH channels to an I branch or a Q branch based on the number of codes used by the DPCH and the E-DCH and the HS-DSCH configuration.

In another aspect of the present invention, a method of allocating a plurality of uplink transmission channels in a user equipment (UE) using I/Q branch mapping includes determining whether a Dedicated Physical Data Channel (DPDCH) is supported by the UE. The method further includes determining whether a High Speed Downlink Shared Channel (HS-DSCH) is configured for the UE and allocating at least one Enhanced Dedicated Physical Data Channels (E-DPDCHs) to an I branch or a Q branch based on whether the DPDCH supported and whether the HS-DSCH is configured.

In another aspect of the present invention, a communication system for allocating a plurality of uplink transmission channels in a user equipment using I/Q branch mapping includes a base station and a user equipment. The UE is configured to determine whether a Dedicated Physical Data Channel (DPDCH) is supported by the UE, determine whether a High Speed Downlink Shared Channel (HS-DSCH) is configured for the UE, and allocate at least one Enhanced Dedicated Physical Data Channels (E-DPDCHs) to an I branch or a Q branch based on whether the DPDCH supported and whether the HS-DSCH is configured.

In another aspect of the present invention, a mobile station for transmitting a plurality of uplink channels using multi-code transmission includes Enhanced Dedicated Physical Data Channels (E-DPDCHs) which are alternately allocated to an I branch and a Q branch, starting with a first E-DPDCH being allocated to the I branch if a High Speed Downlink Shared Channel (HS-DSCH) is configured to a user equipment (UE), and the E-DPDCHs which are alternately allocated to the I branch or the Q branch, starting with the first E-DPDCH being allocated to the Q branch if the HS-DSCH is not configure to the UE.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
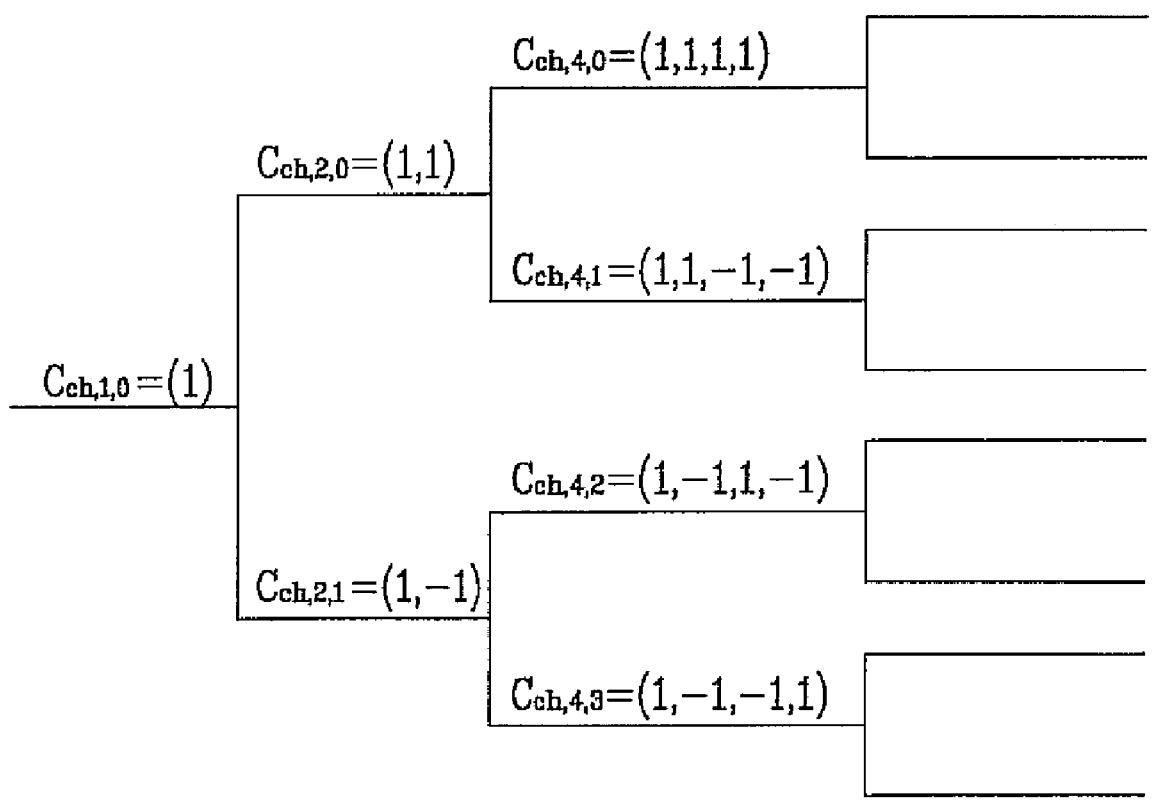
FIG. 1 illustrates an Orthogonal Variable Spreading Factor code tree.
Figure 2:
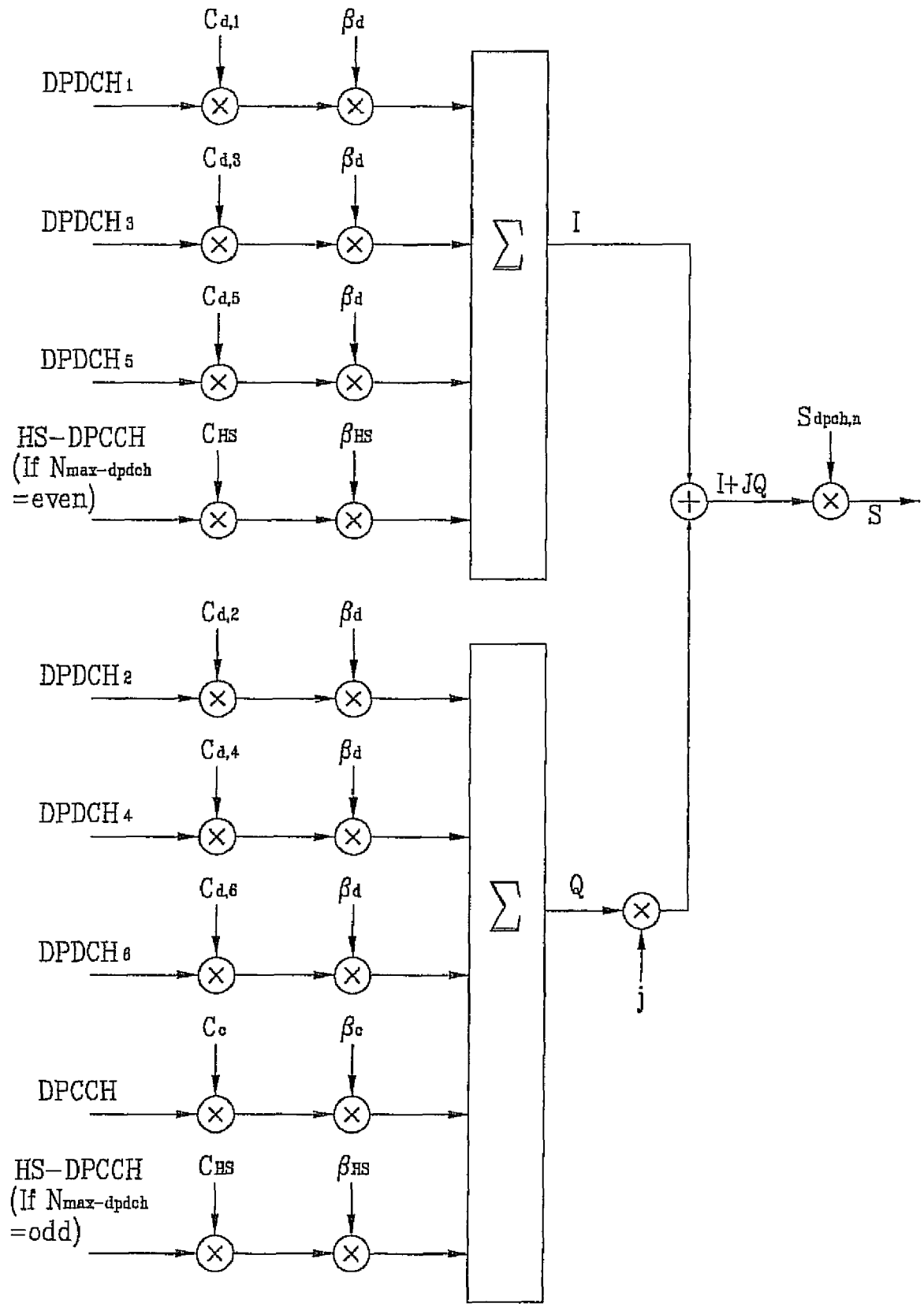
FIG. 2 illustrates a code allocation of uplink DPCH and HS-DPCCH.

Reference will now be made in detail to the preferred embodiments of the present invention, examples of which are illustrated in the accompanying drawings. Wherever possible, the same reference numbers will be used throughout the drawings to refer to the same or like parts.

In the preferred embodiment of the present invention, E-DCH and DPCH are simultaneously transmitted. In particular, the allocation of E-DCH and DPCH is explained in detail. The allocation of channelization codes of E-DCH and DPCH represent maintaining orthogonality between channels having different transmission rate and different spreading factors. The spreading factor is determined based on the amount of data.

In allocating channels when E-DCH and DPCH are simultaneously transmitted, it is DPCH which is allocated. The reason for such a priority allocation is to prevent backward compatibility issues. DPCH is allocated prior to allocating E-DCH because Node B cannot detect DPCH if E-DCH uses the allocated code initially allocated to DPCH. DPCH is allocated first a code which corresponds to SF/4 of the OVSF code tree. For example, if the spreading factor is 4, DPCH is allocated to code 1 ($C_{ch,4,1}$) of the OVSF code tree. Thereafter, E-DCH is allocated to remaining codes in the OVSF code tree.

With respect to E-DCH, E-DPDCHs and E-DPCCH are used to control the data channels. These channels are combined with existing uplink physical channel for transmission. In operation, E-DPCCH is allocated and fixed to the I branch and determines the order for allocating codes of E-DPDCH based on configuration of HS-DSCH to attain optimum Peak-to-Average Power Ratio (PAPR).

Furthermore, if a code for E-DCH is allocated to any one of available code in the OVSF code tree, the PAPR increases affecting the performance of a UE. Therefore, if E-DCH allocated a plurality of codes, the spreading factor is limited to four (SF=4). In the specification, a single code is referred to as a code. Moreover, a term expressed to indicate more than one code is expressed as codes and also can be expressed as multicodes.

In the present invention, the question of whether HS-DSCH is configured for the UE is important. Therefore, the discussions are based on sets of situations where one set has HS-DSCH configured for the UE while the other set does not. The following situations include HS-DSCH not configured for a UE.

In a situation where E-DCH and DPCH each use a single code, as explained above, DPCH is first allocated a code from the OVSF code tree. More specifically, Dedicated Physical Control Channel (DPCCH) is allocated an OVSF code 0 of SF=256 ($C_{ch,256,0}$), which is a child code of OVSF code 0 of SF=4 ($C_{ch,4,0}$). In addition, DPDCH is allocated a code corresponding to SF/4 ($C_{ch,4,1}$). With respect to E-DCH, other remaining OVSF code other than the codes corresponding to mother code and child codes of SF/4 of DPCH can be allocated to E-DCH. Here, for example, an OVSF code corresponding to SF/2 ($C_{ch,SF,SF/2}$) can be used.

After the OVSF codes are allocated to respective E-DCH and DPCH, DPDCH is allocated to the I branch while DPCCH is allocated to the Q branch. Moreover, since DPDCH is allocated to the I branch, E-DCH is allocated to the Q branch. Consequently, E-DCH can use the same OVSF codes as used by DPCH.

Furthermore, if DPCH uses two codes while E-DCH uses one code, two DPDCHs are allocated to a code corresponding to 1 ($C_{ch,4,1}$) and allocated to I/Q branches in the order of (I, Q). As explained above, the allocation of DPCCH in the Q branch is same. As for E-DCH, since a code that can be allocated to E-DCH cannot be to a child code allocated to the DPCH, a code branching from a different mother code is allocated to E-DCH. For example, since the spreading factor is 4 which means DPDCH is allocated to code corresponding to 1 ($C_{ch,4,1}$), E-DCH can be allocated to a code corresponding to SF/2 ($C_{ch,SF,SF/2}$). Here, E-DCH can be allocated to either the I branch or the Q branch.

If DPCH uses three codes, three DPDCHs are allocated codes corresponding to 1 and 3. More specifically, the allocated OVSF codes are ($C_{ch,4,1}$, $C_{ch4,1}$, and $C_{ch,4,3}$). Theses DPDCHs are allocated to the I/Q branches in the order of (I, Q, I). Here, E-DCH can be allocated to a code not associated with a child code of codes corresponding to 1 or 3. For example, E-DCH can be allocated a code corresponding to 2 and can be allocated to either I or Q branch. Moreover, since the third DPDCH is allocated to the I branch, E-DCH can be allocated to a child code of the code corresponding to 3 which is allocated to the Q branch.

If DPCH uses four codes to one code used by E-DCH, the codes allocated to DPDCH correspond to 1 and 3. In other words, the allocated OVSF codes are ($C_{ch,4,1}$, $C_{ch4,1}$, $C_{ch,4,3}$, and $C_{ch,4,3}$). These DPDCHs are allocated to the I/Q branches in the order of (I, Q, I, Q). Here, as same as above, E-DCH can use a code not belonging to a child code corresponding to 1 and 3. For example, E-DCH can be allocated an OVSF code corresponding to 2. Again, E-DCH can be allocated to either the I branch or the Q branch since DPDCH does not occupy any codes corresponding to SF/2.

In a situation where DPCH uses five codes, five DPDCHs are allocated codes corresponding to 1, 3, and 2. In other words, the allocated OVSF codes are ($C_{ch,4,1}$, $C_{ch,4,1}$, $C_{ch,4,3}$, $C_{ch,4,3}$, and $C_{ch,4,2}$). These DPDCHs are allocated to the I/Q branches in the order of (I, Q, I, Q, I) branches. Here, since these five DPDCHs occupy all available codes with DPCCH occupying code 0, a new code cannot be allocated to E-DCH. However, since the fifth DPDCH having a code corresponding to 2 is allocated to the I branch, E-DCH can be allocated to the Q branch while having an allocated code corresponding to SF/2.

In the same vein, if DPCH uses six codes, E-DCH cannot use OVSF codes for allocation since all the codes are occupied.

In contrast to above situations provided above with respect to DPCH using a plurality of codes while E-DCH used a single code, the following situations include E-DCH using a plurality of codes while DPCH uses a single code. Again, the following situations share the same condition as above in which HS-DSCH is not configured a UE.

If E-DCH uses one code and DPCH also uses one code, as same as the above situations, DPCH is allocated to a code corresponding to SF/4 ($C_{ch,SF,SF/4}$) and allocated to the I branch since the HS-DSCH is not configured to a UE. In addition, More specifically, Dedicated Physical Control Channel (DPCCH) is allocated an OVSF code 0 of SF=256 ($C_{ch,256,0}$), which is a child code of OVSF code 0 of SF=4 ($C_{ch,4,0}$). Here, DPDCH is allocated a code corresponding to SF/4 ($C_{ch,SF,SF/4}$). As for E-DCH, other OVSF code other than the codes corresponding to the mother code and the child code of SF/4 of DPCH can be allocated to E-DCH. For example, an OVSF code corresponding to SF/2 ($C_{ch,SF,SF/2}$) can be used.

After the OVSF codes are allocated to respective E-DCH and DPCH, DPDCH is allocated to the I branch while DPCCH is allocated to the Q branch. Moreover, since DPDCH is allocated to the I branch, E-DCH is allocated to the Q branch. Consequently, E-DCH can use the same OVSF codes as used by DPCH. For example, as in DPCH allocation, a first E-DPDCH is allocated to the Q branch. Thereafter, E-DPDCHs are allocated alternately where the second E-DPDCH is then allocated to the I branch.

In a situation where E-DCH uses two codes and DPCH uses a single code, the spreading factor remains 4 and DPCH occupies the child codes corresponding to codes 0 ($C_{ch,4,0}$) and 1 ($C_{ch,4,1}$). The reason is that DPCCH has been allocated to a child code of $C_{ch,4,0}$, and DPDCH has been allocated to $C_{ch,4,1}$. Therefore, E-DCHs can be allocated to available OVSF codes belonging to codes that correspond to 2 ($C_{ch,4,2}$) or 3 ($C_{ch,4,3}$) and can be allocated the I/Q branches in the order of either (I, Q) or (Q, I). If E-DCHs are allocated to the branches in order of (I, Q), DPDCH is allocated to the I branch, and therefore, E-DCH allocated to the I branch has to use a different code from that of DPDCH. Subsequently, E-DCH can use all codes except for code that corresponds to 1 of SF=4. In the Q branch, E-DCH can share the code with DPDCH, e.g., using ($C_{ch,4,3}$, $C_{ch,4,1}$). On the other hand, if E-DCH is allocated to the (Q, I) branches, an example would be to use ($C_{ch,4,1}$, $C_{ch,4,3}$).

If E-DCH uses three codes to one code used by DPCH, E-DCH can be allocated to either (I, Q, I) or (Q, I, Q) branches. Here, E-DCH cannot have been allocated to the child codes of code corresponding to 1 of SF=4 ($C_{ch,4,1}$) in the I branch since E-DPCCH occupies that code. At the same time, E-DCH cannot have been allocated to the child codes of code 0 of SF=4 ($C_{ch,4,0}$) in the Q branch since DPCCH occupies that code. For example, if E-DCHs are allocated to the branches in the order of (I, Q, I), the OVSF allocated codes that correspond accordingly would be ($C_{ch,4,3}$, $C_{ch,4,1}$, $C_{ch,4,2}$). If E-DCHs are allocated to the branches in the order of (Q, I, Q), the corresponding allocated codes are ($C_{ch,4,1}$, $C_{ch,4,3}$, $C_{ch,4,3}$).

In a situation where E-DCH uses four codes while DPCH uses one code, E-DCHs can be allocated to the I/Q branches in the order of (I, Q, I, Q) or (Q, I, Q, I). Similar to the explanations of above, E-DCHs can be allocated to available codes except to the child codes of a code corresponding to 1 of SF=4 ($C_{ch,4,1}$) in the I branch and the child codes of a code that correspond to code 0 ($C_{ch,4,0}$) in the Q branch. Again, the reason for this is because E-DPCCH occupies ($C_{ch,4,1}$) in the I branch when HS-DSCH is not configured, and DPCCH occupies ($C_{ch,4,0}$) in the Q branch when HS-DSCH is not configured. For example, if E-DCHs are allocated to the branches in the order of (I, Q, I, Q), the corresponding OVSF codes are ($C_{ch,4,3}$, $C_{ch,4,1}$, $C_{ch,4,2}$, $C_{ch,4,2}$) so as to avoid conflicts with other occupied codes. Moreover, if E-DCHs are allocated to the branches in the order of (Q, I, Q, I), the corresponding OVSF codes are ($C_{ch,4,1}$, $C_{ch,4,3}$, $C_{ch,4,3}$, $C_{ch,4,2}$) to avoid conflict with occupied codes E-DPCCH in the I branch and DPCCH in the Q branch.

If E-DCH uses five codes, E-DCHs can be allocated to the I/Q branches in the order of (Q, I, Q, I, Q). Again, E-DCHs can be allocated to available codes except to the child codes of code corresponding to 1 of SF=4 ($C_{ch,4,1}$) in the I branch and the child codes of code that corresponds to code 0 ($C_{ch,4,0}$) in the Q branch. For example, code allocation corresponding to the allocated branches would be ($C_{ch,4,1}$, $C_{ch,4,3}$, $C_{ch,4,3}$, $C_{ch,4,2}$, $C_{ch,4,2}$).

In a situation where E-DCH uses six codes, OVSF codes cannot be allocated to E-DCH. However, if a codes corresponding to code 0 ($C_{ch,4,0}$) is allocated to the I branch, it is possible to allocate a code to E-DCH. For example, the allocated OVSF codes can be ($C_{ch,4,0}$, $C_{ch,4,1}$, $C_{ch,4,2}$, $C_{ch,4,2}$, $C_{ch,4,3}$, $C_{ch,4,3}$).

In a situation where both E-DCH and DPCH use a plurality of codes, DPDCH is first allocated to the I branch, followed by allocation of codes of E-DCH. For example, if three codes are allocated to DPDCH and two to E-DCH, the OVSF codes allocated to DPDCH are ($C_{ch,4,1}$, $C_{ch,4,1}$, $C_{ch,4,3}$) and are respectively allocated to the I/Q branches in the order of (I, Q, I) while the codes allocated to E-DCH ($C_{ch,4,3}$, $C_{ch,4,2}$) are allocated to the I/Q branches in the order of (Q, I).

In another embodiment of the present invention, HS-DSCH is configured to a UE making it necessary to transmit HS-DPCCH.

If E-DCH and DPDCH each use one code, DPDCH is allocated to a code corresponding to SF/4 and further allocated to the I branch. HS-DPCCH is allocated to code corresponding to $C_{ch,256,64}$ and is further allocated to the Q branch. As for E-DCH, E-DCH can be allocated to available OVSF codes except to the mother and child codes of a code corresponding to SF/4. In other words, E-DCH cannot be allocated to the mother and child codes of a code corresponding to $C_{ch,4,1}$ since DPDCH is first allocated to that code in the I branch. Furthermore, the codes not associated with the mother and child codes of code 0 ($C_{ch,4,0}$) and code 64

($C_{ch,256,64}$) of the spreading factor 256 can be allocated. As explained above, HS-DPCCH is allocated to the code 64 ($C_{ch,256,64}$), and DPCCH is allocated to code 0 ($C_{ch,256,0}$).

In a situation where E-DCH uses one code while DPDCH uses a plurality of codes, the codes are first allocated to DPDCH and HS-DPCCH. As for DPDCH, the OVSF codes are allocated ($C_{ch,4,1}$, $C_{ch,4,1}$, $C_{ch,4,3}$, $C_{ch,4,3}$, $C_{ch,4,2}$, $C_{ch,4,2}$) and further allocated to the I/Q branches in the order of (I, Q, I, Q, I, Q). As for HS-DPCCH, DPDCHs are allocated based on the number of codes. If the maximum available number of codes of DPDCH are even numbered, i.e., 2, 4, or 6, the HS-DPCCH is allocated to code corresponding to 1 of SF=256 and further allocated to the I branch. If the maximum available number of codes of DPDCHs are 3 or 5, then the HS-DPCCH is allocated to a code corresponding to 32 of SF=256 ($C_{ch,256,32}$) and further allocated to the Q branch. After DPDCHs and HS-DPCCH are allocated in such manners, the codes of E-DCHs are allocated. Here, the first E-DPDCH is allocated to the I branch. For example, if there are four codes of DPDCH, DPDCHs are allocated to the branches in the order of (I, Q, I, Q) having OVSF codes corresponding to ($C_{ch,4,1}$, $C_{ch,4,1}$, $C_{ch,4,3}$, $C_{ch,4,3}$). At the same time, HS-DPCCH is allocated to the Q branch. Here, E-DCH can use OVSF codes not based from the mother and child codes of codes corresponding to SF/4 and SF*3/4 in the I branch or the Q branch. For example, E-DCH can use the child code of code corresponding to SF/2. In the same manner, if DPDCH uses different number of codes, by using the same principle, OVSF code allocation for E-DCH can be employed.

Table 1 summarizes the allocation of E-DPDCHs using I/Q branch mapping based on DPDCH and whether HS-DSCH is configured for the UE. Although the number of DPDCH is limited to one in the table, there can be more than one DPDCHs. In Table 1, 'j' relates to designation to the Q branch while '1' relates to designation to the I branch.

TABLE 1

| DPDCH | HS-DSCH configured | E-DPDCH$_k$ | iq$_{ed,k}$ |
|---|---|---|---|
| 1 | No | E-DPDCH$_1$ | j |
|   |    | E-DPDCH$_2$ | 1 |
| 1 | Yes | E-DPDCH$_1$ | 1 |
|   |    | E-DPDCH$_2$ | j |

In a situation where a user equipment (UE) is configured to HS-DSCH and E-DCH, High Speed Dedicated Physical Control Channel (HS-DPCCH) first allocates OVSF codes according to the existing order of allocation since the UE has to transmit HS-DPCCH in the uplink direction. The existing order of allocation include, for example, allocating the first DPDCH to the I branch.

If HS-DSCH is configured to a UE, E-DPCCH and DPDCH along with E-DPDCH are allocated to the I branch while DPCCH and HS-DPCCH are allocated to the Q branch. However, if HS-DSCH is not configured to a UE and DPDCH are allocated to the I branch while DPCCH and E-DPDCH are allocated to the Q branch.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a plurality of uplink channels by a user equipment (UE) to a base station, the method comprising:

multiplying each of channelization codes denoted by Cch,SF,k, and generated as Orthogonal Variable Spreading Factor (OVSF) codes, to each of the plurality of uplink channels, wherein "SF" is a spreading factor and "k" is a channelization code number;

mapping each of the plurality of uplink channels to an I branch or a Q branch; and transmitting the plurality of uplink channels, multiplied by each of the channelization codes and mapped to the I branch or the Q branch, to the base station, wherein a Dedicated Physical Data Channel (DPDCH) of the plurality of uplink channels is mapped to the I branch, and a channelization code of Cch,SF,SF/4 is multiplied to the DPDCH, wherein a High Speed—Dedicated Physical Control Channel (HS-DPCCH) of the plurality of uplink channels is predetermined to be mapped to the Q branch, and a channelization code of Cch,256,64 is predetermined to be multiplied to the HS-DPCCH, when a High Speed—Downlink Shared Channel (HS-DSCH) is configured for the UE, wherein a first E-DPDCH of the plurality of uplink channels is mapped to the Q branch, when the HS-DSCH is not configured for the UE, wherein the first E-DPDCH is mapped to the I branch, when the HS-DSCH is configured for the UE, and wherein a specific channelization code, other than mother codes and child codes of the Cch,SF,SF/4, is multiplied to the first E-DPDCH regardless of whether the HS-DSCH is configured or not.

2. The method of claim 1, wherein the specific channelization code is Cch,SF,SF/2.

3. A user equipment (UE) for transmitting a plurality of uplink channels, the UE comprising:

a processor configured to:
  multiply each of channelization codes denoted by Cch,SF,k, and generated as Orthogonal Variable Spreading Factor (OVSF) codes, to each of the plurality of uplink channels, wherein "SF" is a spreading factor and "k" is a channelization code number; and
  map each of the plurality of uplink channels to an I branch or a Q branch; and a transmitter configured to transmit the plurality of uplink channels, multiplied by each of the channelization codes and mapped to the I branch or the Q branch, wherein a Dedicated Physical Data Channel (DPDCH) of the plurality of uplink channels is mapped to the I branch, and a channelization code of Cch,SF,SF/4 is multiplied to the DPDCH, wherein a High Speed—Dedicated Physical Control Channel (HS-DPCCH) of the plurality of uplink channels is predetermined to be mapped to the Q branch, and a channelization code of Cch,256,64 is predetermined to be multiplied to the HS-DPCCH, when a High Speed—Downlink Shared Channel (HS-DSCH) is configured for the UE, wherein a first E-DPDCH of the plurality of uplink channels is mapped to the Q branch, when the HS-DSCH is not configured for the UE, wherein the first E-DPDCH is mapped to the I branch, when the HS-DSCH is configured for the UE, and wherein a specific channelization code, other than mother codes and child codes of the Cch,SF,SF/4, is multiplied to the first E-DPDCH regardless of whether the HS-DSCH is configured or not.

4. The UE of claim 3, wherein the specific channelization code is Cch,SF,SF/2.

* * * * *